US011911890B2

(12) United States Patent
Ha

(10) Patent No.: US 11,911,890 B2
(45) Date of Patent: *Feb. 27, 2024

(54) METHOD, SYSTEM, AND NON-TRANSITORY COMPUTER-READABLE RECORDING MEDIUM FOR PROVIDING A SERVICE USING A ROBOT

(71) Applicant: Bear Robotics, Inc., Redwood City, CA (US)

(72) Inventor: John Jungwoo Ha, Seoul (KR)

(73) Assignee: Bear Robotics, Inc., Redwood City, CA (US)

(*) Notice: Subject to any disclaimer, the term of this patent is extended or adjusted under 35 U.S.C. 154(b) by 490 days.

This patent is subject to a terminal disclaimer.

(21) Appl. No.: 17/242,782

(22) Filed: Apr. 28, 2021

(65) Prior Publication Data

US 2022/0347857 A1 Nov. 3, 2022

(51) Int. Cl.
*G06Q 50/12* (2012.01)
*B25J 11/00* (2006.01)

(52) U.S. Cl.
CPC .......... *B25J 11/008* (2013.01); *B25J 11/0005* (2013.01); *G06Q 50/12* (2013.01)

(58) Field of Classification Search
CPC ... B25J 11/008; B25J 11/005; G06Q 30/0266; G06Q 30/0281
See application file for complete search history.

(56) References Cited

U.S. PATENT DOCUMENTS

| 8,509,947 B2* | 8/2013 | Jarisch | A47J 31/407 |
| | | | 221/96 |
| 9,557,740 B2* | 1/2017 | Crawley | B25J 11/008 |
| 11,093,995 B2* | 8/2021 | Kawamura | H04N 7/183 |
| 11,568,445 B2* | 1/2023 | Ha | G06Q 30/0261 |

(Continued)

FOREIGN PATENT DOCUMENTS

| JP | 2007160440 A | 6/2007 |
| JP | 2012243094 A | 12/2012 |

(Continued)

OTHER PUBLICATIONS

Kanda et al., A Communication Robot in a Shopping Mall, 2010, IEEE, p. 897-913 (Year: 2010).*

(Continued)

*Primary Examiner* — McDieunel Marc
(74) *Attorney, Agent, or Firm* — Dinsmore & Shohl LLP; Yongsok Choi, Esq.

(57) ABSTRACT

A method for providing a service using a robot is provided. The method includes the steps of: acquiring information associated with a serving place of the robot and information on a customer visiting the serving place; determining service guide information including information on at least one of a travel route to a table to be provided to the customer, among a plurality of tables in the serving place, and a conversation scenario to be provided to the customer during travel to the table to be provided to the customer, with reference to the information associated with the serving place and the information on the customer; and providing the customer with a (Continued)

service associated with the serving place by the robot with reference to the service guide information.

17 Claims, 6 Drawing Sheets

(56) References Cited

U.S. PATENT DOCUMENTS

| | | | | |
|---|---|---|---|---|
| 2012/0278178 | A1* | 11/2012 | Fung | G06Q 30/0255 705/14.66 |
| 2023/0179969 | A1* | 6/2023 | Pateromichelakis | H04L 41/0894 370/329 |
| 2023/0324923 | A1* | 10/2023 | Lee | G05D 1/0274 701/25 |

FOREIGN PATENT DOCUMENTS

| | | |
|---|---|---|
| JP | 2018146183 A | 9/2018 |
| JP | 2018161711 A | 10/2018 |
| JP | 2019003360 A | 1/2019 |
| KR | 1020110004015 A | 1/2011 |
| KR | 1020110103537 A | 9/2011 |
| KR | 1020180054528 A | 5/2018 |
| KR | 1020200084769 A | 7/2020 |
| KR | 1020210017981 A | 2/2021 |

OTHER PUBLICATIONS

Li et al., A Human-Friendly Communication Robot for Public Service Based on iBeacon Technology, 2019, IEEE, p. 1-5 (Year: 2019).*

Selaka et al., Fuzzy-Bot: A Food Serving Robot as a Teaching and Learning Platform for Fuzzy Logic, 2018, IEEE, p. 565-570 (Year: 2018).*

Antony et al., Food Delivery Automation in Restaurants Using Collaborative Robotics, 2018, IEEE, p. 1-7 (Year: 2018).*

* cited by examiner

METHOD, SYSTEM, AND NON-TRANSITORY COMPUTER-READABLE RECORDING MEDIUM FOR PROVIDING A SERVICE USING A ROBOT

FIELD OF THE INVENTION

The present invention relates to a method, system, and non-transitory computer-readable recording medium for providing a service using a robot.

BACKGROUND

Robots are utilized to replace or assist people in various fields because they can automatically perform difficult tasks or repetitive operations. Recently, various researches are being conducted on techniques for providing services using such robots.

As an example of related conventional techniques, Korean Registered Patent Publication No. 10-1083700 discloses a robot system for serving ordered food in a restaurant by transporting a container containing the food.

However, the techniques introduced so far as well as the above-described conventional technique have been only interested in how a robot can serve ordered food well (e.g. how to avoid an obstacle such as a table), and have not specifically addressed causing a robot to provide a comprehensive service for greeting customers who visit a serving place, seating the customers, taking orders, and the like (i.e., a host service). In particular, when the host service is provided, communication or conversation with the customers is important because it contributes to the first impression formation or image-making of the serving place. Therefore, information associated with the serving place and information on customers visiting the serving place need to be comprehensively and adaptively considered in order to effectively provide the host service.

In this connection, the inventor(s) present a novel and inventive technique for determining service guide information with reference to information associated with a serving place and information on a customer visiting the serving place, and adaptively providing a service associated with the serving place by a robot on the basis of the service guide information.

SUMMARY OF THE INVENTION

One object of the present invention is to solve all the above-described problems in the prior art.

Another object of the invention is to provide a robot-based host service for causing a robot to, for example, greet, converse with, seat, and take orders from customers visiting a serving place, in consideration of information associated with the serving place and information on the customers.

Yet another object of the invention is to allow a robot to continue an appropriate situational conversation flow while guiding a customer visiting a serving place to a table, on the basis of a conversation scenario determined in consideration of information associated with the serving place and information on the customer.

The representative configurations of the invention to achieve the above objects are described below.

According to one aspect of the invention, there is provided a method for providing a service using a robot, the method comprising the steps of: acquiring information associated with a serving place of the robot and information on a customer visiting the serving place; determining service guide information including information on at least one of a travel route to a table to be provided to the customer, among a plurality of tables in the serving place, and a conversation scenario to be provided to the customer during travel to the table to be provided to the customer, with reference to the information associated with the serving place and the information on the customer; and providing the customer with a service associated with the serving place by the robot with reference to the service guide information.

According to another aspect of the invention, there is provided a system for providing a service using a robot, the system comprising: an information acquisition unit configured to acquire information associated with a serving place of the robot and information on a customer visiting the serving place; a service guide information determination unit configured to determine service guide information including information on at least one of a travel route to a table to be provided to the customer, among a plurality of tables in the serving place, and a conversation scenario to be provided to the customer during travel to the table to be provided to the customer, with reference to the information associated with the serving place and the information on the customer; and a service provision unit configured to provide the customer with a service associated with the serving place by the robot with reference to the service guide information.

In addition, there are further provided other methods and systems to implement the invention, as well as non-transitory computer-readable recording media having stored thereon computer programs for executing the methods.

According to the invention, it is possible to provide a robot-based host service for causing a robot to, for example, greet, converse with, seat, and take orders from customers visiting a serving place, in consideration of information associated with the serving place and information on the customers.

According to the invention, it is possible to build intimacy with a customer visiting a serving place and increase the customer's satisfaction with the serving place by allowing a robot to continue an appropriate situational conversation flow while guiding the customer to a table, on the basis of a conversation scenario determined in consideration of information associated with the serving place and information on the customer.

DETAILED DESCRIPTION OF THE INVENTION

Figure 1:
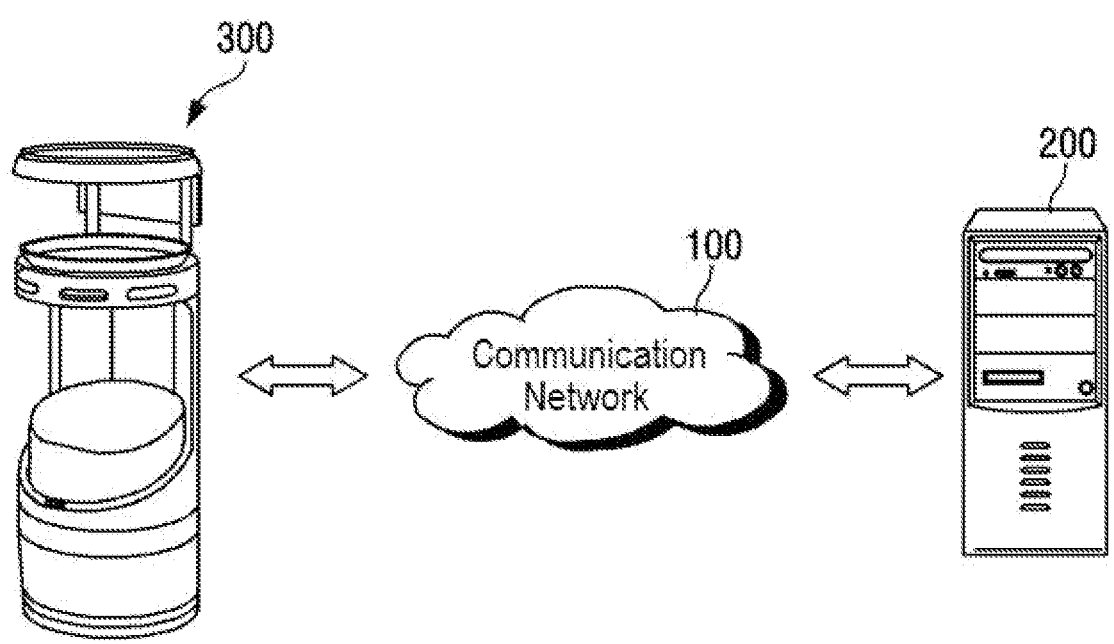
FIG. 1 schematically shows the configuration of an entire system for providing a service using a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for providing a service using a robot according to one embodiment of the invention.

As shown in FIG. 1, the entire system according to one embodiment of the invention may comprise a communication network 100, a service provision system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as Wi-Fi communication, Wi-Fi Direct communication, Long Term Evolution (LTE) communication, Bluetooth communication (more specifically, Bluetooth Low Energy (BLE) communication), infrared communication, and ultrasonic communication.

Next, the service provision system 200 according to one embodiment of the invention may communicate with the robot 300 to be described below via the communication network 100, and may function to: acquire information associated with a serving place of the robot 300 and information on a customer visiting the serving place; determine service guide information including information on at least one of a travel route to a table to be provided to the customer, among a plurality of tables in the serving place, and a conversation scenario to be provided to the customer during travel to the table to be provided to the customer, with reference to the information associated with the serving place and the information on the customer; and provide the customer with a service associated with the serving place by the robot 300 with reference to the service guide information.

Meanwhile, the above description is illustrative although the service provision system 200 has been described as above, and it will be apparent to those skilled in the art that at least a part of the functions or components required for the service provision system 200 may be implemented or included in the robot 300 to be described below or an external system (not shown), as necessary. Further, in some cases, all of the functions and components of the service provision system 200 may be implemented or included in the robot 300.

Next, the robot 300 according to one embodiment of the invention is a device that may communicate with the service provision system 200 via the communication network 100, and may autonomously perform predetermined functions or assigned tasks (e.g., serving food, retrieving containers, etc.) without any operation of a user. The robot 300 may include at least one of a module (e.g., a grab, a robotic arm module, etc.) for loading and unloading an object (e.g., a food tray), an imaging module (e.g., a visible light camera, an infrared camera, etc.) for acquiring images of surroundings, and a drive module (e.g., a motor) for moving the robot 300. For example, the robot 300 may have characteristics or functions similar to those of at least one of a guide robot, a transport robot, a cleaning robot, a medical robot, an entertainment robot, a pet robot, and an unmanned flying robot.

Meanwhile, according to one embodiment of the invention, the robot 300 may include an application for providing a service according to the invention. The application may be downloaded from the service provision system 200 or an external application distribution server (not shown).

Configuration of the Service Provision System

Hereinafter, the internal configuration of the service provision system 200 crucial for implementing the invention and the functions of the respective components thereof will be discussed.

Figure 2:
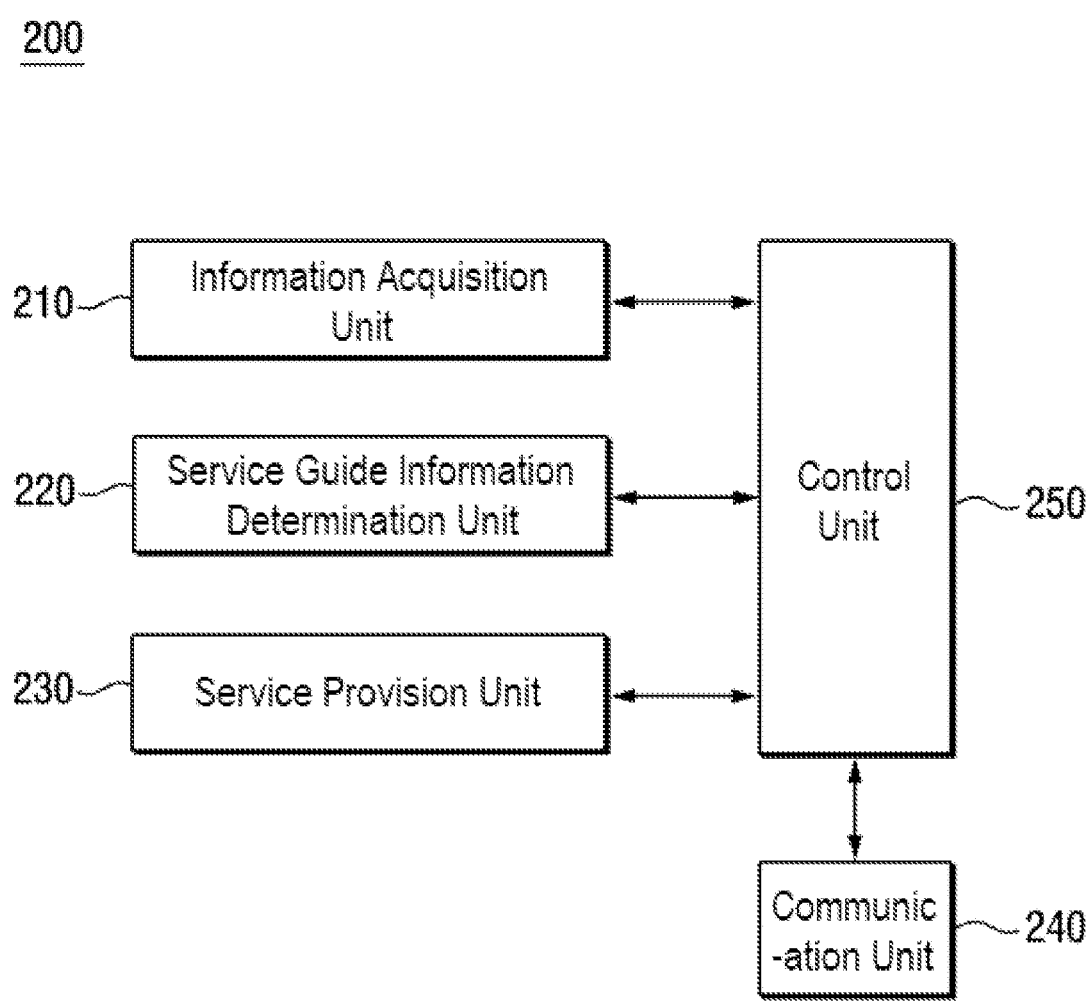
FIG. 2 illustratively shows the internal configuration of a service provision system according to one embodiment of the invention.

FIG. 2 illustratively shows the internal configuration of the service provision system 200 according to one embodiment of the invention.

As shown in FIG. 2, the service provision system 200 according to one embodiment of the invention may comprise an information acquisition unit 210, a service guide information determination unit 220, a service provision unit 230, a communication unit 240, and a control unit 250. According to one embodiment of the invention, at least some of the information acquisition unit 210, the service guide information determination unit 220, the service provision unit 230, the communication unit 240, and the control unit 250 may be program modules that communicate with an external system. The program modules may be included in the service provision system 200 in the form of operating systems, application program modules, and other program modules, while they may be physically stored in a variety of commonly known storage devices. Further, the program modules may also be stored in a remote storage device that may communicate with the service provision system 200. Meanwhile, such program modules may include, but are not limited to, routines, subroutines, programs, objects, components, and data structures for performing specific tasks or executing specific abstract data types according to the invention as will be described below.

First, the information acquisition unit 210 according to one embodiment of the invention may function to acquire information associated with a serving place of the robot 300 and information on a customer visiting the serving place. For example, the information associated with the serving place of the robot 300 may include place information of the serving place such as a name, type of business, address, and region of the serving place, and situation information of the serving place such as unoccupied tables in the serving place (or tables expected to be unoccupied and times required for the tables to be unoccupied), status of orders made in the serving place, and available menus of the serving place. Further, the information on the customer according to one embodiment of the invention may include identification information of the customer such as a gender, age, headcount, and type (e.g., couple or family) of the customer, and information on visit history of the customer (e.g., information on ordered food, used tables, and conversation made with the robot 300 during previous visits of a customer whose identity is specified on the basis of his/her face).

For example, when the serving place according to one embodiment of the invention is a restaurant, the information acquisition unit 210 may acquire information associated with the serving place such as a name of the restaurant, a type of business of the restaurant, an address of the restaurant, a region of the restaurant, unoccupied tables in the restaurant, a time required for a table to be unoccupied in the restaurant (which may be determined in consideration of when food is served to a customer at a specific table, and an average ingestion time for each food (or customer), for example), status of orders and ingredient supply/demand in the restaurant (e.g., how many orders are piled up, how much ingredients are left, etc.), and special menus of the restaurant (e.g., today's menu), and information on customers visiting the serving place such as ages, genders, a headcount, a type (e.g., couple or family), and visit history of the customers visiting the restaurant.

More specifically, the information acquisition unit 210 may interwork with an inventory management system, a point of sale (POS) information management system, an enterprise resource planning (ERP) system, or the like of the restaurant, and may acquire information associated with the serving place through the system. Further, the information acquisition unit 210 may use an imaging module provided in the robot 300 or the serving place to identify appearance information such as a face and body shape of a customer visiting the serving place, and may acquire information on the customer on the basis of the identified information.

Next, the service guide information determination unit 220 according to one embodiment of the invention may function to determine service guide information including information on at least one of a travel route to a table to be provided to the customer, among a plurality of tables in the serving place, and a conversation scenario to be provided to the customer during travel to the table to be provided to the customer, with reference to the information acquired by the information acquisition unit 210. Here, the service guide information determination unit 220 may determine a table to be provided to a customer visiting the serving place, with respect to tables estimated to be highly preferred by the customer or tables with high priority in the serving place, among a plurality of unoccupied tables (or tables to be unoccupied). More specifically, the service guide information determination unit 220 may determine the tables estimated to be highly preferred by the customer or the tables with high priority in the serving place, with reference to a result of learning table preference patterns or preferred tables according to times, ages, genders, and the like of a plurality of customers, and may determine a table with the highest preference or priority, among the plurality of unoccupied tables (or tables to be unoccupied) in the serving place, as the table to be provided to the customer. Meanwhile, the service guide information determination unit 220 may specify tables preferred by the customer with reference to visit history of the customer (specifically, the customer's history of visits to the serving place), and may determine the table to be provided to the customer with reference to the specified preferred tables. Further, the service guide information determination unit 220 may assign weights to tables frequently used by the customer, which are specified with reference to the visit history of the customer, and may determine the table to be provided to the customer on the basis of the weights (e.g., on the basis of a result of learning the table preference patterns or preferred tables with the weights being reflected).

For example, the service guide information determination unit 220 may determine information on an optimal travel route for moving the customer to the table to be provided to the customer with respect to a location of the customer (e.g., an entrance to the serving place), with reference to information on at least one of a travel route of another robot 300 in the serving place, status of table arrangement in the serving place, and status of table occupancy in the serving place. More specifically, when the serving place according to the invention is a restaurant, the service guide information determination unit 220 may determine the information on the optimal travel route on the basis of a shortest travel route that does not overlap with the travel route of the other robot 300 in the restaurant (or an area within a predetermined distance from the travel route), allows a relatively large travel space to be secured, and runs around tables with fewer customers in the restaurant, among a plurality of routes between the location of the entrance to the restaurant (i.e., the current location of the customer) and the table in the restaurant to be provided to the customer.

As another example, the service guide information determination unit 220 may determine the information on the conversation scenario with reference to the information associated with the serving place and the information on the customer, such that at least one small talk about an introduction to the serving place, products (e.g., menus) of the serving place, weather associated with the region of the serving place, news or sports, jokes, or interests according to the gender or age of the customer (e.g., fashion) is made during travel to the table to be provided to the customer. The conversation scenario herein may refer to a development manner or a flow of conversation to be made between the customer and the robot 300 on the basis of at least one conversation topic.

More specifically, the service guide information determination unit 220 may determine the information on the conversation scenario such that the customer is provided with a small talk whose conversation topic is at least one of an introduction to the serving place, products (e.g., menus) of the serving place, weather associated with the region of the serving place, news or sports, and jokes, and the conversation of the same topic is developed or the conversation is switched to a different topic according to feedback provided from the customer (e.g., positive or negative feedback) while the flow of the conversation is continued for a predetermined time.

Further, the service guide information determination unit 220 may determine the information on the conversation scenario to be provided to the customer with reference to a distance of the travel route to the table to be provided to the customer.

For example, the service guide information determination unit 220 may determine the information on the conversation scenario on the basis of a conversation topic, conversation length, and conversation progress (e.g., introduction, development, turn, and conclusion) corresponding to the distance of the travel route to the table to be provided to the customer. More specifically, the service guide information determination unit 220 may determine that the distance of the travel route to the table to be provided to the customer and the conversation length have a predetermined relationship (e.g., a proportional relationship), and may determine the information on the conversation scenario on the basis of the conversation length corresponding to the relationship and the conversation topic or conversation progress suitable for the conversation length. Meanwhile, the service guide information determination unit 220 may determine the information on the conversation scenario with reference to a lookup table for conversation progress or conversation topics according to conversation lengths.

Further, the service guide information determination unit 220 may determine the information on the conversation scenario on the basis of a conversation topic of high interest to the customer.

For example, the service guide information determination unit 220 may specify a conversation topic estimated to be of high interest to (or preferred by) a customer visiting the serving place, with reference to demographic information (e.g., an age, gender, race, etc.) specified from the appearance of the customer or the customer's history of visits to the serving place, and may determine the information on the conversation scenario such that the flow of conversation is continued for a predetermined time on the basis of a small talk corresponding to the preferred conversation topic.

Meanwhile, the conversation scenario described above may be not only predetermined but also continuously updated by repeatedly searching for, collecting, refining, and learning conversation topics, sentences, and the like through social network services (SNS), web servers, cloud servers, and the like.

For example, a plurality of conversation scenarios may be collected (e.g., crawled) through social network services, web servers, cloud servers, and the like, and with respect to consecutive sentences of the plurality of conversation scenarios, semantic vectors (which may be determined using algorithms such as word2vec and sentence2vec, for example) and intention patterns (which are related to intention or context meant by each sentence and order of each sentence in relation to other sentences, and may be classified through various artificial intelligence algorithms such as a deep neutral network (DNN), a convolutional neural network (CNN), and a support vector machine (SVM)) may be extracted for the sentences. A database for generating a conversation scenario on the basis of the extracted semantic vectors and intention patterns (e.g., a conversation scenario may be generated by combining sentences on the basis of the semantic vectors and intention patterns) may be periodically or aperiodically updated.

Further, the service guide information determination unit 220 may perform learning with reference to the information on the conversation scenario and information on feedback provided from the customer in response to the conversation scenario, and may determine information on a conversation scenario to be be provided to the customer or similar customers (e.g., customers of similar gender, age, race, etc.) with reference to a result of the learning.

Next, the service provision unit 230 according to one embodiment of the invention may function to provide the customer with a service associated with the serving place by the robot 300 with reference to the service guide information. For example, when the serving place according to one embodiment of the invention is a restaurant, the service associated with the serving place may include services such as reception, order taking, serving, and payment taking.

For example, the service provision unit 230 may provide a customer visiting the serving place with a reception service by the robot 300 making conversation related to greetings, jokes, weather, sports, an introduction to the serving place (e.g., a representative menu or today's menu), and the like with the customer while guiding the customer to the table to be provided to the customer. More specifically, although the conversation between the customer and the robot 300 may be carried out through voice, it should be noted that the manner of the conversation according to the invention is not necessarily limited to voice and may be changed to various manners such as video.

Next, according to one embodiment of the invention, the communication unit 240 may function to enable data transmission/reception from/to the information acquisition unit 210, the service guide information determination unit 220, and the service provision unit 230.

Lastly, according to one embodiment of the invention, the control unit 250 may function to control data flow among the information acquisition unit 210, the service guide information determination unit 220, the service provision unit 230, and the communication unit 240. That is, the control unit 250 according to one embodiment of the invention may control data flow into/out of the service provision system 200 or data flow among the respective components of the service provision system 200, such that the information acquisition unit 210, the service guide information determination unit 220, the service provision unit 230, and the communication unit 240 may carry out their particular functions, respectively.

Figure 3:
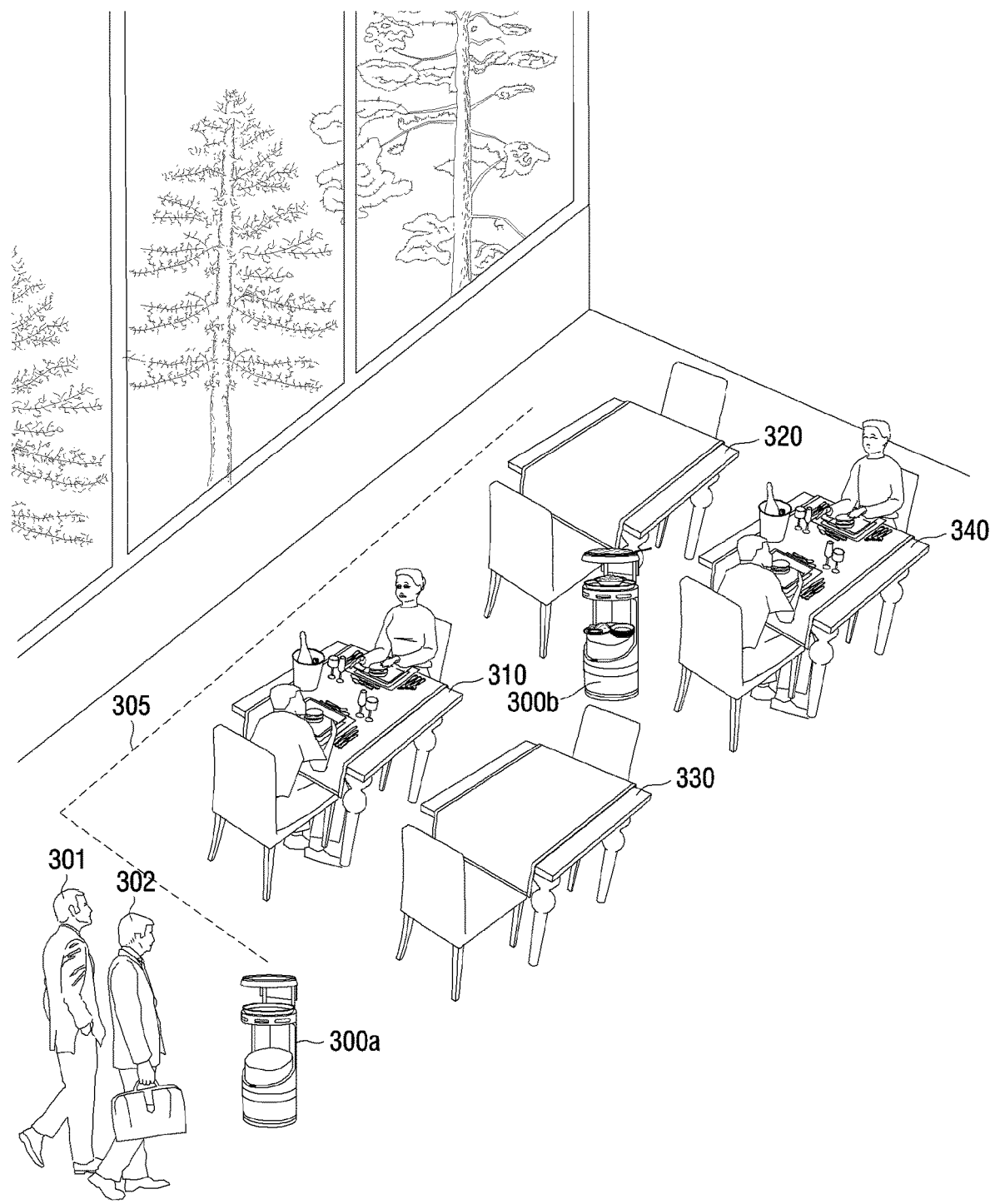
FIG. 3 illustratively shows a situation in which a service is provided using a robot according to one embodiment of the invention.
Figure 4:
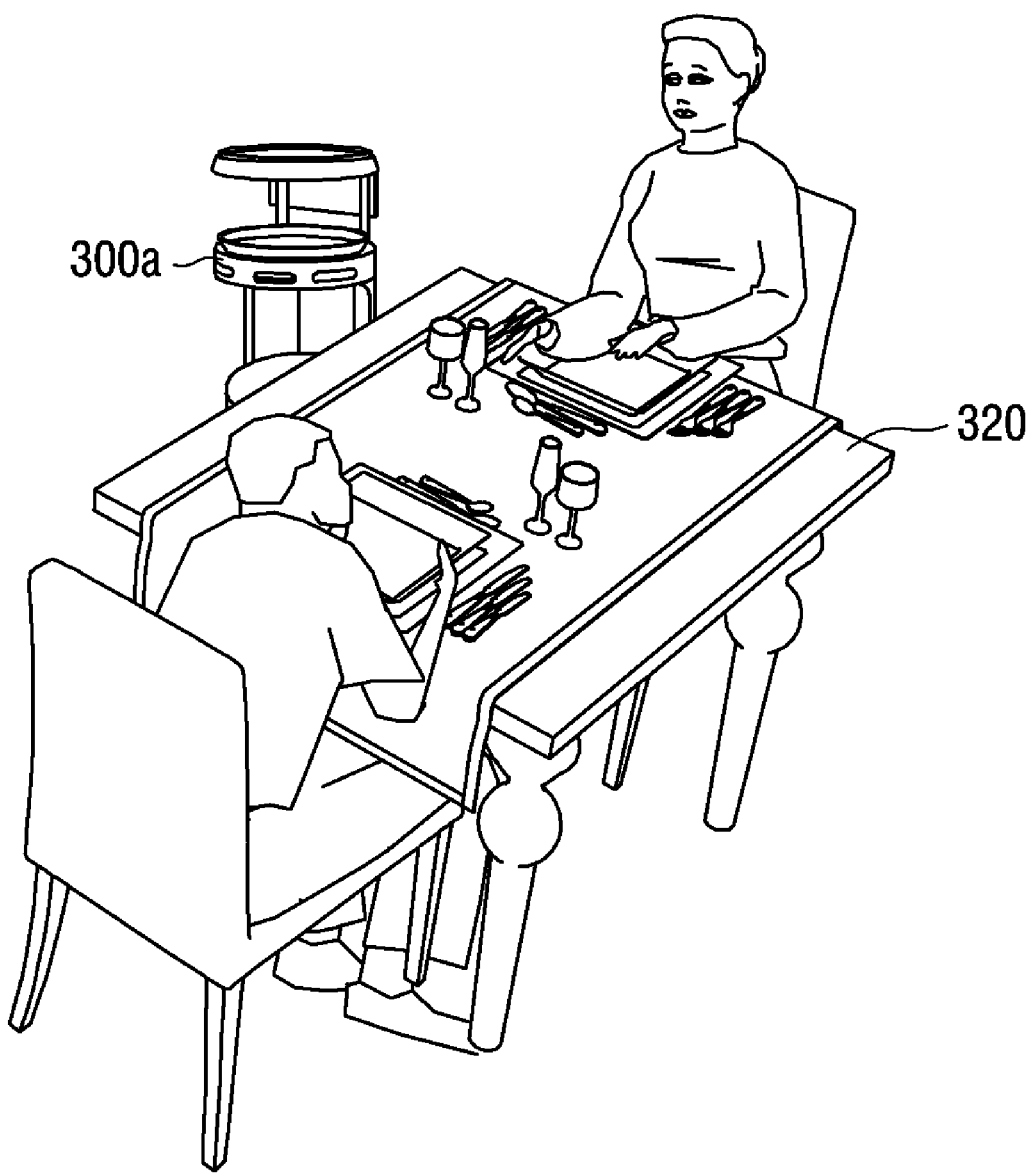
FIG. 4 illustratively shows a situation in which a service is provided using a robot according to one embodiment of the invention.

FIGS. 3 and 4 illustratively show a situation in which a service is provided using the robot 300 according to one embodiment of the invention.

Referring to FIG. 3, it may be assumed that a serving place according to the invention is a restaurant and services are provided to customers visiting the restaurant by the robot 300. Further, services associated with the serving place may be provided in the restaurant by a plurality of robots 300*a* and 300*b*.

First, according to one embodiment of the invention, when a plurality of customers 301 and 302 visit a restaurant where services are provided by the robot 300, information associated with the restaurant and information on the plurality of customers 301 and 302 visiting the restaurant may be acquired.

For example, information associated with the restaurant such as a name of the restaurant, a type of business of the restaurant, an address of the restaurant, a region of the restaurant, unoccupied tables in the restaurant, and a time required for a table to be unoccupied in the restaurant, status of orders and ingredient supply/demand in the restaurant, and special menus of the restaurant, and information on the customers visiting the restaurant such as ages, genders, a headcount, a type (e.g., couple or family), and visit history of the customers may be acquired.

More specifically, information that the headcount of the customers visiting the serving place is 2, the genders of the customers are male and female, the type of the customers is a couple, and the ages of the customers are 30s may be acquired as the information on the customers, using an imaging module of the robot 300*a*. Further, information that two tables 320 and 330 are unoccupied in the restaurant, other tables 310 and 340 are occupied by other customers, and an estimated time of finishing meals at the occupied tables is 30 minutes may be acquired through a POS information management system of the restaurant.

Next, according to one embodiment of the invention, service guide information including information on at least one of a travel route to the table 320 to be provided to the customers 301 and 302 visiting the restaurant, among a plurality of tables in the restaurant, and a conversation scenario to be provided to the customers 301 and 302 during travel to the table 320 to be provided to the customers 301 and 302 may be determined with reference to the information associated with the restaurant and the information on the customers 301 and 302.

For example, service guide information including information on at least one of a travel route 305 running along a window to the table 320 in the restaurant to be provided to the customers 301 and 302 visiting the restaurant, and a conversation scenario for developing conversation with the customers 301 and 302 in the order of greetings, weather, jokes, today's menu, and the location of the table 320 during travel along the travel route 305 to the table 320 may be determined with reference to the information associated with the restaurant and the information on the customers 301 and 302. More specifically, the table 320 to be provided to the customers 301 and 302 (i.e., the table by the window) may be determined with respect to tables estimated to be highly preferred by the customers 301 and 302 visiting the restaurant or tables with high priority for men or women in 30s in the restaurant, among a plurality of unoccupied tables (or tables to be unoccupied) in the restaurant. Meanwhile, in this case, when both the tables 310 and 320 by the window are occupied, a table to be provided to the customers 301 and 302 may be determined with reference to times required for the occupied tables to be unoccupied. Next, the information on the travel route may be determined on the basis of the shortest travel route 305 that does not overlap with a travel route of the other robot 300b in the restaurant and allows a predetermined level of travel space to be secured, among a plurality of routes from the current location of the customers 301 and 302 to the table 320 to be provided to the customers 301 and 302.

Next, according to one embodiment of the invention, the robot 300a may provide the customers 301 and 302 with a service associated with the restaurant, with reference to the service guide information.

For example, the robot 300a may provide a reception service by developing conversation in the order of greetings, weather, jokes, today's menu, and the location of the table 320 to be provided while guiding the customers 301 and 302 along the travel route 305, with reference to the service guide information determined as above.

Next, referring to FIG. 4, when the customers 301 and 302 are seated at the provided table 320, the robot 300a may provide various services associated with the restaurant, such as order taking, serving, and payment taking.

Meanwhile, according to one embodiment of the invention, the robot 300a may provide a service related to at least one of information, reservation, and payment for products or services of the restaurant (or another serving place) that are estimated to be of high interest to the customers 301 and 302, with reference to the information associated with the restaurant and the information on the customers visiting the restaurant.

For example, it may be estimated that the customers 301 and 302 are highly interested in information on a gift certificate of a certain value for a discount in the restaurant, with reference to information on gift certificates being promoted in the restaurant and frequencies and value amounts of meals of the customers 301 and 302. The information on the gift certificate may be given to the customers 301 and 302 or a reservation for the gift certificate may be made, and even payment may be made through the robot 300a. In this case, the robot 300 may further include a payment means such as a payment terminal (e.g., a credit card terminal) and a display (e.g., a display for outputting a QR code for payment).

Meanwhile, it is noted that the products or services estimated to be of high interest to the customers 301 and 302 according to the invention are not limited to those associated with a specific serving place, and may be extended to a variety of products (e.g., baseball tickets) or services of other serving places specified with reference to information on customers.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 5:
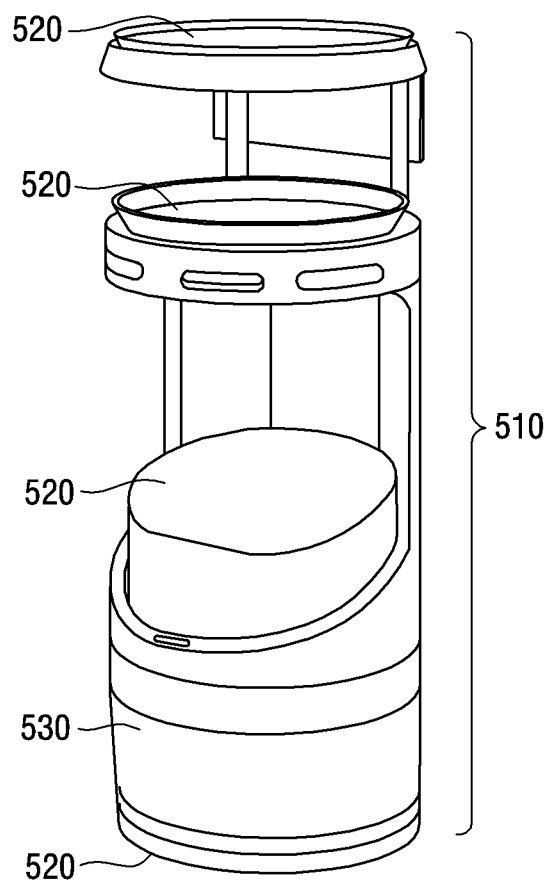
FIG. 5 illustratively shows the structure of a robot according to one embodiment of the invention.

Referring to FIG. 5, the robot 300 may comprise a main body 510, a drive unit 520, and a processor 530.

For example, the main body 510 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Figure 6:
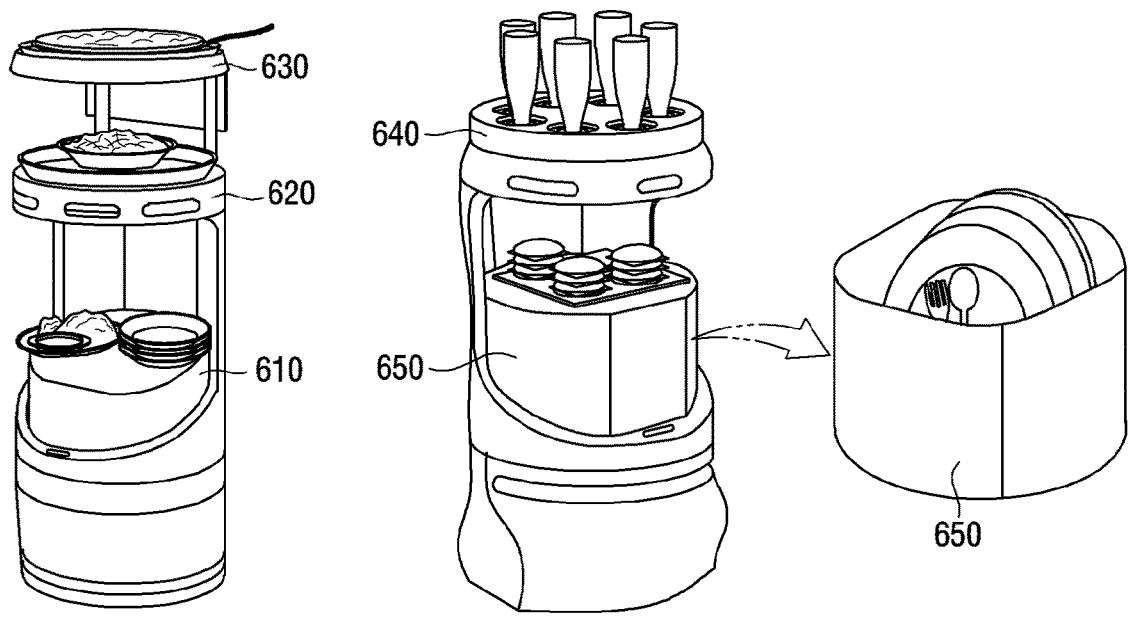
FIG. 6 illustratively shows the structure of a robot according to one embodiment of the invention.

Referring to FIG. 6, when the robot 300 is a serving robot, it may include a first space 610 and a second space 620 for providing the transported object and collecting the retrieved object. Further, the robot 300 may further include a third space 630 that is an expansion space provided via a removable pillar, and more loading spaces may be provided by adding more expansion spaces as needed. Further, the robot 300 may further include a tray 640 dedicated for the transported or retrieved object. For example, the tray 640 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 610 of the robot 300 may include a fourth space 650 that may be taken out through a lateral side of the robot 300. The fourth space 650 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 5, the main body 510 may further include an imaging module (e.g., a visible light camera, an infrared camera, etc.) (not shown) and a scanner module (e.g., a LIDAR sensor) for acquiring images of surroundings (e.g., customers, tables, employees, other robots 300, etc.) and information on obstacles.

Next, the drive unit 520 according to one embodiment of the invention may comprise a module for moving the main body 510 to other locations or a module for loading and unloading the transported and retrieved objects.

For example, the drive unit 520 may include a module related to electrically, mechanically, or hydraulically driven wheels, propellers, or the like as the module for moving the main body 510 to other locations, and may include a robotic arm module for mounting and conveying the transported and retrieved objects as the module for loading and unloading the transported and retrieved objects.

Next, the processor 530 according to one embodiment of the invention may be electrically connected to the drive unit 520 to perform a function of controlling the drive unit 520 (and may include a communication module for communicating with an external system). For example, the processor 530 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 530 may perform the functions of at least one of the information acquisition unit 210, the service guide information determination unit 220, and the service provision unit 230 of the service provision system 200 according to the invention (e.g., the corresponding functions may be modularized and included in the processor 530), and may function to control the drive unit 520 through communication with an external system (not shown) that performs the functions of at least one of the information acquisition unit 210, the service guide information determination unit 220, and the service provision unit 230.

Specifically, the processor 530 may function to: acquire information associated with a serving place of the robot 300 and information on a customer visiting the serving place; determine service guide information including information on at least one of a travel route to a table to be provided to the customer, among a plurality of tables in the serving place, and a conversation scenario to be provided to the customer during travel to the table to be provided to the customer, with reference to the information associated with the serving place and the information on the customer; and provide the customer with a service associated with the serving place by the robot 300 with reference to the service guide information.

Although the embodiments in which the serving place according to the invention is a restaurant have been mainly described above, it is noted that the serving place is not necessarily limited to a restaurant, and may be changed to a cafe, pub, bar, or the like without limitation as long as the objects of the invention may be achieved.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing a service using a robot, the method comprising the steps of:
    acquiring information associated with a serving place of the robot and information on a customer visiting the serving place;
    determining service guide information including information on at least one of a travel route to a table to be provided to the customer, among a plurality of tables in the serving place, and a conversation scenario to be provided to the customer during travel to the table to be provided to the customer, with reference to the information associated with the serving place and the information on the customer; and
    providing the customer with a service associated with the serving place by the robot with reference to the service guide information.

2. The method of claim 1, wherein in the determining step, the table to be provided to the customer is determined with respect to tables estimated to be preferred by the customer or tables with priority in the serving place, among a plurality of unoccupied tables in the serving place.

3. The method of claim 1, wherein in the determining step, the table to be provided to the customer is determined with reference to a time required for a table to be unoccupied among the plurality of tables.

4. The method of claim 1, wherein in the determining step, the information on the travel route is determined with reference to at least one of a travel route of another robot in the serving place, status of table arrangement in the serving place, and status of table occupancy in the serving place.

5. The method of claim 1, wherein in the determining step, the information on the conversation scenario is determined on the basis of a conversation topic in which the customer is interested at or above a predetermined level.

6. The method of claim 1, wherein in the determining step, the information on the conversation scenario is determined with reference to a distance of the travel route to the table to be provided to the customer.

7. The method of claim 1, wherein in the providing step, a reception service for providing voice conversation with the customer while guiding the customer to the table to be provided to the customer is provided as the service associated with the serving place.

8. The method of claim 1, wherein in the providing step, a service related to at least one of information, reservation, and payment for products or services of the serving place or another serving place that are estimated to be of interest to the customer is provided by the robot.

9. A non-transitory computer-readable recording medium having stored thereon a computer program for executing the method of claim 1.

10. A system for providing a service using a robot, the system comprising:
an information acquisition unit configured to acquire information associated with a serving place of the robot and information on a customer visiting the serving place;
a service guide information determination unit configured to determine service guide information including information on at least one of a travel route to a table to be provided to the customer, among a plurality of tables in the serving place, and a conversation scenario to be provided to the customer during travel to the table to be provided to the customer, with reference to the information associated with the serving place and the information on the customer; and
a service provision unit configured to provide the customer with a service associated with the serving place by the robot with reference to the service guide information.

11. The system of claim 10, wherein the service guide information determination unit is configured to determine the table to be provided to the customer with respect to tables estimated to be preferred by the customer or tables with priority in the serving place, among a plurality of unoccupied tables in the serving place.

12. The system of claim 10, wherein the service guide information determination unit is configured to determine the table to be provided to the customer with reference to a time required for a table to be unoccupied among the plurality of tables.

13. The system of claim 10, wherein the service guide information determination unit is configured to determine the information on the travel route with reference to at least one of a travel route of another robot in the serving place, status of table arrangement in the serving place, and status of table occupancy in the serving place.

14. The system of claim 10, wherein the service guide information determination unit is configured to determine the information on the conversation scenario on the basis of a conversation topic in which the customer is interested at or above a predetermined level.

15. The system of claim 10, wherein the service guide information determination unit is configured to determine the information on the conversation scenario with reference to a distance of the travel route to the table to be provided to the customer.

16. The system of claim 10, wherein the service provision unit is configured to provide a reception service for providing voice conversation with the customer while guiding the customer to the table to be provided to the customer as the service associated with the serving place.

17. The system of claim 10, wherein the service provision unit is configured to provide a service related to at least one of information, reservation, and payment for products or services of the serving place or another serving place that are estimated to be of interest to the customer by the robot.

* * * * *